June 28, 1960            J. W. POND            2,942,642

INFLATABLE VEHICLE TIRE WITH VALVE IN A SIDEWALL

Filed April 23, 1956

INVENTOR.
JAMES W. POND
BY
ATTY.

United States Patent Office 2,942,642
Patented June 28, 1960

2,942,642

INFLATABLE VEHICLE TIRE WITH VALVE IN A SIDEWALL

James W. Pond, Doylestown, Ohio, assignor to The B. F. Goodrich Company, New York, N.Y., a corporation of New York Filed Apr. 23, 1956, Ser. No. 583,350

5 Claims. (Cl. 152—429)

This invention relates to inflatable vehicle tires and, more particularly, to the combination with such a tire of a valve in the sidewall thereof. The method by which this combination is effected is described and claimed in my copending application, Serial No. 767,219, filed October 14, 1958, which is a division of this application.

Recently, it has been proposed that the conventional spare or extra tire and wheel assembly be eliminated from passenger vehicles and replaced by an emergency tire having sufficient flexibility to permit folding or collapsing when deflated. A tire of this nature is disclosed and claimed in the co-pending application of Frank Herzegh and James W. Pond, Serial No. 580,291, filed April 24, 1956. Such a tire preferably has a self-contained inflation chamber to which inflation fluid is to be supplied through a valve secured to a part of the tire as, for example, the sidewall of the carcass, so that it is unnecessary to remove the conventional tubeless tire valve from the rim when the tire replaced is of the latter type. Likewise, the provision of a valve in the carcass sidewall makes it unnecessary to plug or seal the valve opening in the wheel rim when the conventional tire removed therefrom is of the type employing a separate inner tube nor is it necessary to locate the emergency tire on the rim so that its valve passes through the valve opening in the rim.

The provision of the inflation controlling valve in the sidewall of a conventional tubeless vehicle tire, especially of the type employed on passenger vehicles, is also advantageous since it permits the wheel rim to be formed without a valve hole or slot, thereby reducing the cost and eliminating one possible avenue of leakage of the inflation fluid. In addition, the elimination of the separate tire valve as now used for tubeless tire inflation, makes mounting of the tires more rapid and less difficult.

An object of the invention is, therefore, to provide an improved combination of an inflatable tire with a valve in the sidewall thereof.

Another object of the invention is to provide an improved inflation controlling valve in the sidewall of the tire in a manner such that the stem may be applied after cure of the tire so that the surface of the tire has no outwardly projecting portions during shaping or curing operations.

A more specific object of the invention is to provide an improved inflation controlling valve in the sidewall of the tire characterized by a metal base member disposed between the plies of the tire carcass sidewall with the ends of the base member entirely disposed beneath the surface of the tire, the base member having a threaded bore into which a valve stem member is screwed.

A still more specific object of the invention is to provide an improved combination of an inflatable tire with an inflation controlling valve characterized by the valve having a metal base member with a threaded bore, which base member is embedded in a rubber pad with the latter incorporated between the fabric plies of the sidewall of a tire carcass and having a valve stem screwed into the said threaded bore.

The invention further resides in certain novel features of the construction and arrangement of parts of a tire provided with a valve in the sidewall thereof, and further objects and advantages of the invention will be apparent to those skilled in the art to which the invention pertains from the following description of the presently preferred embodiment, and a modification thereof, described in conjunction with the accompanying drawing forming a part of this application and in which.

Figure 1:
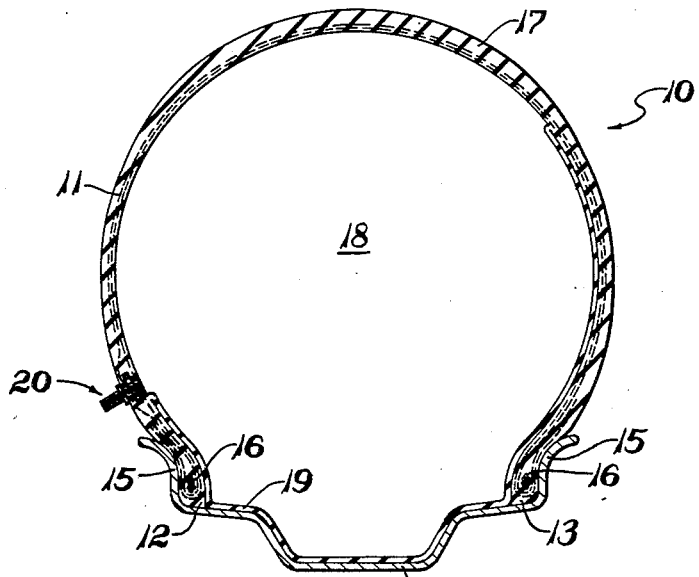
Fig. 1 is a fragmentary transverse sectional view through an emergency tire mounted on a rim and inflated, the tire being provided with a valve in the sidewall in accordance with this invention.

The invention is herein illustrated and described specifically with reference to its employment in an emergency tire of the type disclosed and claimed in the aforementioned copending application Serial No. 580,291, filed April 24, 1956, since such use facilitates exposition of the procedure and the details of construction. A tire 10 of this nature comprises a thin wall carcass 11 formed of fabric reinforced elastomer, the carcass having axially spaced circumferentially extending beads 12 and 13 adapted to be mounted upon the bead seats of a conventional wheel rim 14 in engagement with the flanges 15 of the latter. The beads 12 and 13 are each provided with a bead core 16 which is circumferentially non-extensible as in conventional tires but preferably differs therefrom in being laterally flexible to permit folding of the tire when the latter is deflated.

In addition to flexibility of the bead cores, an emergency tire of the type indicated at 10 should possess a tread and sidewall construction of sufficient flexibility to permit collapse or folding of the tire when deflated. Therefore, the carcass 11 of the tire may employ as few as two plies of bias-laid cord fabric and the tread 17 of the tire may be formed by a comparatively thin piece of tread stock placed on the running surface of the tire and extending down the sidewalls of the carcass only far enough to protect the latter during cornering or turning.

In view of the fact that the emergency tire 10 is intended to be capable of use without the necessity of removing from the rim the inflation valve normally employed for a tubeless tire, and without the need of separate inner tube, the tire 10 includes a self-contained inflation chamber 18. This self-contained inflation chamber is formed by employing a portion of the interior surface of the carcass 11 as a part of the wall of that chamber and a flexible annular sheet or layer 19 of elastometer, united to the wall of the carcass along the circumferential extending marginal or edge portions of the sheet, as the remainder of the wall of the chamber. The construction of a tire of this nature is usch that, when the tire is mounted on a wheel rim and inflation fluid is supplied to the inflation chamber 18, the annular sheet or layer 19 is deformed into the wheel rim in the manner shown in Fig. 1.

Inflation of the tire 10 is effected through a valve means 20 that is mounted in the sidewall of the tire intermediate one of the beads 12 or 13 and the running surface or tread portion 17 of the tire. Preferably, this valve is located radially inwardly of the region of maximum transverse diameter of the tire to eliminate or reduce the possibility of injury to the valve as the tire moves closely adjacent a stationary object. The valve is however, located a sufficient distance radially outwardly from the adjacent bead so that the valve is above the rim flange 15 and cannot engage the latter upon turning or cornering of the wheel on which the tire is mounted.

In accordance with this invention, the valve 20 is provided in the sidewall of the tire in a manner such that there is no projecting portion extending beyond the surfaces of the tire carcass during forming and curing of the tire so that the latter can be handled by forming and curing apparatus of conventional construction, the valve stem being applied to the valve assembly after curing of the tire sidewall. These advantages are achieved by providing the valve in two detachable parts, one of which comprises a base member 21, which is incorporated into the tire sidewall during building of the latter, the other portion of the valve comprising the removable valve stem 22 provided with the conventional valve core 23, this stem being applied to the tire after curing of the latter.

Figure 2:
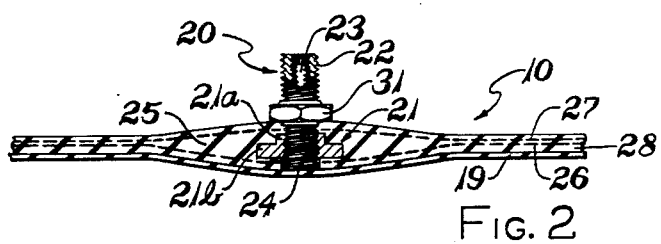
Fig. 2 is an enlarged fragmentary sectional view through the cured tire in the region of the valve more clearly illustrating the manner in which the valve is incorporated in the tire.
Figure 4:
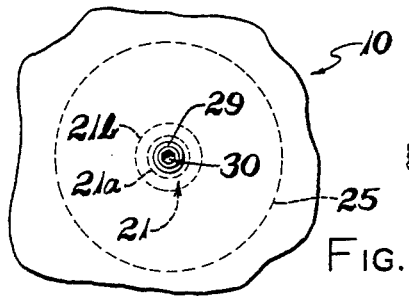
Fig. 4 is a fragmentary top plan view of the portion of the tire shown in Fig. 3.
Figure 3:
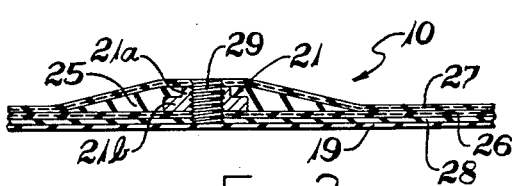
Fig. 3 is an enlarged fragmentary sectional view of an uncured or green tire in the region shown in Fig. 2 illustrating the present preferred embodiment of the method of incorporating the valve in the tire sidewall.

In the presently preferred procedure for incorporating the valve into the tire sidewall, a valve base member 21 having a threaded central bore 24, is embedded in and united with a pad 25 of elastomer which may be substantially circular in outer configuration and of thickness at the central portion in the order of the thickness of the valve base, the pad tapering to a thin edge at the periphery as is indicated by the region between the upper and lower dotted lines in Figs. 2 and 3. The pad 25 may be cured or vulcanized to effect a firm and permanent union with the valve base member.

The tire 10 is constructed by sequentially placing in superposed relationship, the layer or sheet 19 and at least two plies 26 and 27 of bias-laid fabric reinforced elastomeric material of the type normally employed for building tire carcasses. The layer 19 and the adjacent surface of the ply 26, which may include an extra thickness 28 of elastomer, if desired, are suitably treated, or of compositions such, that adherence of the sheet 19 is effected only in the marginal or edge regions of the sheet and the area therebetween is non-adhered to facilitate separation as indicated in Fig. 1 when the inflation fluid is supplied between the carcass and the sheet 19. The ply 26 is provided with an opening or aperture of diameter substantially the same as that of the threaded bore 24 of the valve base member 21 and, before the ply 27 is applied, the base member 21 with its pad 25 are placed upon the ply 26 with the threaded opening in the valve member aligned with the said aperture or opening in the ply 26, but with the said threaded opening plugged or filled to prevent the entrance of rubber therein during subsequent curing. This temporary filling or plugging of the threaded opening in the valve base member 21 may be effected by any known expedient. Preferably, however, the said filling or plugging of the threaded opening is achieved by inserting in the latter a threaded metal plug 29 of length such that its end surfaces are substantially co-planar with the outer surfaces of the tire carcass, defined by the outer surface of the ply 27 and the inner surface of the ply 26 or of its layer 28. The outer end of the plug 29 is preferably provided with a suitable recess 30, here shown as of hexagonal configuration, for receiving a tool such as a wrench or the like to facilitate applying and removal of the plug.

After the valve base member 21 with its rubber pad 25 has been placed upon the ply 26, the ply 27 is then laid thereover with an opening provided in the latter ply aligned with the threaded bore in the base member 21, a short portion of the plug member 29 preferably projecting into this opening in the ply 27 as indicated in Fig. 3. A strip of thin tread stock 17 is then applied over the portion of the tire carcass which will form the running surface of the tire, the edges of this tread strip terminating short of the sidewall portion in which the valve 20 is located. The carcass is also provided with bead cores 16, the edges of the plies are turned about these cores, and strips of rim cushioning material are supplied to these bead regions if desired. The resulting green or uncured carcass is then removed from the surface on which is has been built or assembled, and is placed in conventional tire shaping and curing apparatus to effect forming and vulcanization of the several parts. The region of the layer 19 intermediate the marginal or edge poritons, however, is not bonded or united to the adjacent surface of the tire carcass as has been explained heretofore.

After curing of the tire is completed, the plug 29 is removed from the valve base member 21 and is replaced by the valve stem 22 the lower end of which is threaded for reception in the threaded bore 24 of the base member. To facilitate applying the stem 22 to the base member, the stem may be provided with a polygonally shaped flange portion 31 which is adapted to be engaged by a wrench or other tool. The lower surface of this flange portion 31 is such that it can seat upon the adjacent surface of the tire carcass and effect an air-tight seal therewith, it being remembered that the outer ply of the carcass extends above the end face of the valve base member 21 to provide elastic material for cooperation with the flange 31 of the valve stem to effect the said sealing action. However, if desired, a separate elastic washer may be provided between the flange 31 and the adjacent surface of the tire carcass should this prove necessary or desirable.

The inner end of the valve stem 22 terminates substantially flush with the inner surface of the tire carcass 11 as shown in Fig. 2 and the passage through the valve communicates the region between the layer 19 and the carcass to the exterior of the tire. Hence, inflation of the tire can be effected by supplying an inflation fluid to the valve stem 22, the core member 23 operating in known manner to retain the inflation fluid which causes the layer 19 to move to the position shown in Fig. 1.

Figure 5:
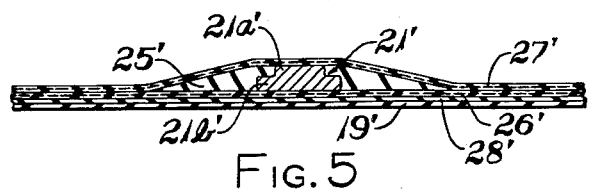
Fig. 5 is a view similar to Fig. 3 but showing another method of incorporating the valve into a tire.

Fig. 5 illustrates a modified embodiment of the invention wherein the valve base member is initially provided in the form of a solid piece of metal. In this embodiment, the valve base member 21' is embedded in and molded to an elastomer pad 25' similar to that employed in the preferred embodiment and the pad with its metal insert are incorporated into the tire in the same manner as previously described except that it is not now necessary to provide apertures in the carcass ply nor a threaded plug in the valve base member. After curing of the tire embodying the modified form of base member 21', a suitable bore is drilled and tapped through this base member and the plies such as 26' and 27' which cover either face of the base member and its pad 25'. This aperture, which does not extend through the separable layer or sheet 19', can be provided by suitably supporting the tire so that the layer or lining 19' falls away from the adjacent face of the carcass during the aforementioned drilling and tapping operation. The valve base member 21', after being thus drilled and tapped, is then identical with valve base member 21 and is provided with a valve stem in the same manner as previously described.

In the illustrated embodiments, the metal valve base members 21 and 21' are each shown as comprising a short shank portion 21a, 21a', respectively and a radially extending flange portion 21b, 21b', respectively. This configuration is not essential to the invention, however, and either of the base members may be of uniform thickness throughout. Moreover, the base portion of the valve need not have the dimensions proportioned as indicated since the thickness thereof need only be sufficient to provide enough thread convolutions in the base 24 to securely hold the valve stem 22.

Although the invention has been described specifically with reference to its incorporation in an emergency tire having a self-contained inflation chamber, the invention is not so limited but may be incorporated in tires of other construction. For example, it is within the purview of this invention to provide a tire and valve combination wherein the tire is of the type employed without an inner tube and in which the rim on which the tire is mounted forms a part of the inflation chamber, it being understood that such rim will either have no valve opening or that, if the usual valve opening is provided, it will be plugged or blocked. Other adaptations and modifications of the invention, which will be apparent to those skilled in the art, are considered as coming within the ambit of this invention which is limited only by the spirit and scope of the appended claims:

Having thus described the invention, I claim:

1. The combination with an inflatable tire carcass including at least two plies of bias-laid elastomer coated fabric, an outer running surface and axially spaced beads adapted to be mounted on a wheel rim, of an inflation fluid controlling valve mounted in the sidewall of said carcass intermediate one of the said beads and the running surface, the said valve including a metal base member molded in a rubber pad and embedded in the carcass sidewall with at least one of said fabric plies extending on either side face of said pad, the said metal base member having a threaded bore therethrough communicating with the space enclosed by the interior of the carcass, and a valve stem provided with a valve core, the said valve stem including a threaded end portion screwed into said base member with the other end of the stem extending outwardly from the carcass.

2. The combination with an inflatable tire carcass including at least two plies of bias-laid elastomer coated fabric, an outer running surface and axially spaced beads adapted to be mounted on a wheel rim, of an inflation fluid controlling valve mounted in the sidewall of said carcass intermediate said beads and running surface, the said valve including a metal base member having a threaded bore therethrough, said bias member being embedded in the carcass sidewall with at least one of said fabric plies extending on either side of the base member and with the said bore communicating with the space enclosed by the interior of the carcass, and a valve stem including a threaded end portion screwed into said base member with the other end of the stem extending outwardly from the carcass and provided with a valve core, the said valve stem including a radially extending flange portion externally of said carcass and cooperating therewith to provide a fluid-tight seal for the threaded connection of said stem and base member.

3. The combination with an inflatable tire carcass, including at least two plies of bias-laid elastomer coated fabric extending between axially spaced beads which are adapted to be mounted on a wheel rim, of an inflation fluid controlling valve mounted in the sidewall of said carcass and including a metal base member having a threaded bore therethrough, said base member being embedded in the carcass sidewall with at least one of said fabric plies extending on either side face thereof and with the bore through the base member communicating with the space enclosed by the carcass, and a valve stem including a threaded end portion screwed into said base member with the other end of the stem extending outwardly from the carcass and provided with a valve core.

4. The combination with an inflatable tire carcass, including at least two plies of bias-laid elastomer coated fabric extending between axially spaced beads which are adapted to be mounted on a wheel rim, of an inflation fluid controlling valve mounted in the sidewall of said carcass, the said valve including a metal base member molded in a rubber pad and embedded in the carcass sidewall with at least one of said fabric plies extending on either side face thereof, the said metal base member having a threaded bore therethrough communicating with the space enclosed by the carcass, and a valve stem including a threaded end portion screwed into said base member with the other end of the stem extending outwardly from the carcass and provided with a valve core.

5. The combination with an inflatable tire carcass, including at least two plies of bias-laid elastomer coated fabric extending between axially spaced beads which are adapted to be mounted on a wheel rim, of an inflation fluid controlling valve mounted in the sidewall of said carcass and including a metal base member having a threaded bore therethrough, said base member being embedded in the carcass sidewall with at least one of said fabric plies extending on either side face thereof and with the bore through the base member communicating with the space enclosed by the carcass, and a valve stem including a threaded end portion screwed into said base member with the other end of the stem extending outwardly from the carcass and provided with a valve core, the said valve stem including a radially extending flange portion externally of said carcass and cooperating therewith to provide a fluid-tight seal for the threaded connection of said stem and base member.

References Cited in the file of this patent
UNITED STATES PATENTS

| | | |
|---|---|---|
| 603,510 | MacSpadden | May 3, 1898 |
| 612,016 | Clark | Oct. 11, 1898 |
| 621,849 | Rickman | Mar. 28, 1899 |
| 1,711,382 | Goldburg | Apr. 30, 1929 |
| 1,990,353 | Sonnett | Feb. 5, 1935 |
| 2,021,295 | Eger | Nov. 19, 1935 |
| 2,169,378 | Williams | Aug. 15, 1939 |
| 2,253,759 | Burkley | Aug. 26, 1941 |
| 2,587,470 | Herzegh | Feb. 26, 1952 |
| 2,618,308 | Khalil | Nov. 18, 1952 |
| 2,621,700 | Snyder | Dec. 16, 1952 |
| 2,765,835 | Pavkov | Oct. 9, 1956 |

UNITED STATES PATENT OFFICE

CERTIFICATE OF CORRECTION

Patent No. 2,942,642                                June 28, 1960

James W. Pond

It is hereby certified that error appears in the printed specification of the above numbered patent requiring correction and that the said Letters Patent should read as corrected below.

Column 2, line 67, for "usch" read -- such --; column 4, line 17, for "poritons" read -- portions --; column 5, line 46, for "bias" read -- base --.

Signed and sealed this 27th day of December 1960.

(SEAL)
Attest:
KARL H. AXLINE                                    ROBERT C. WATSON
Attesting Officer                                  Commissioner of Patents